United States Patent
Endo et al.

(10) Patent No.: US 7,394,214 B2
(45) Date of Patent: Jul. 1, 2008

(54) CONTROL UNIT FOR ELECTRIC POWER STEERING APPARATUS

(75) Inventors: Shuji Endo, Gunma (JP); Yuho Aoki, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 83 days.

(21) Appl. No.: 10/579,771

(22) PCT Filed: Nov. 11, 2004

(86) PCT No.: PCT/JP2004/017115

§ 371 (c)(1), (2), (4) Date: May 18, 2006

(87) PCT Pub. No.: WO2005/049408

PCT Pub. Date: Jan. 2, 2005

(65) Prior Publication Data

US 2007/0103105 A1    May 10, 2007

(30) Foreign Application Priority Data

Nov. 18, 2003    (JP)    ............................. 2003-388351

(51) Int. Cl.
*H02P 7/00* (2006.01)
(52) U.S. Cl. ...................... 318/432; 318/778; 318/434; 180/6.44; 180/6.5
(58) Field of Classification Search ................. 318/727, 318/432, 434, 778; 180/6.44, 6.48, 6.5
See application file for complete search history.

(56) References Cited

U.S. PATENT DOCUMENTS

| 6,504,336 | B2 * | 1/2003 | Sakamaki | 318/727 |
| 6,608,457 | B2 * | 8/2003 | Kogiso | 318/432 |

FOREIGN PATENT DOCUMENTS

| JP | 10-117489 A | 5/1988 |
| JP | 5-112245 A | 5/1993 |
| JP | 2000-279000 A | 10/2000 |
| JP | 2002-58277 A | 2/2002 |
| JP | 2002-145096 A | 5/2002 |
| JP | 2003-24686 A | 1/2003 |
| JP | 2003-40128 A | 2/2003 |
| JP | 2003-513594 A | 4/2003 |
| JP | 2003-267237 A | 9/2003 |
| JP | 2003-291829 A | 10/2003 |

* cited by examiner

*Primary Examiner*—Rina I Duda
(74) *Attorney, Agent, or Firm*—Sughrue Mion, PLLC

(57) ABSTRACT

In order to solve a problem that a motor generates a noise so as to deteriorate an environment in a vehicle if a field weakening control is executed to the motor of a electric power steering apparatus, in the case that a vehicle speed is high, the same field weakening control as the conventional one is applied to the motor because a noise generated due to a friction between a tire and a road surface and a wind noise of a vehicle body are large, and in the case that the vehicle speed is low, the field weakening control is weakly applied in comparison with the conventional one because the noise generated by the motor is felt relatively largely. Accordingly, the field weakening control can be executed in response to the vehicle speed in such a manner as to make the motor noise smaller.

4 Claims, 9 Drawing Sheets

FIG.6
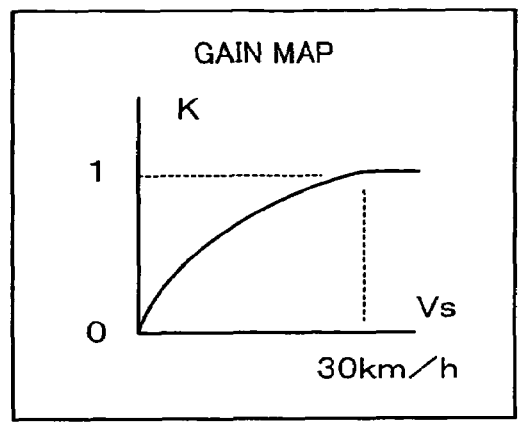
(A)
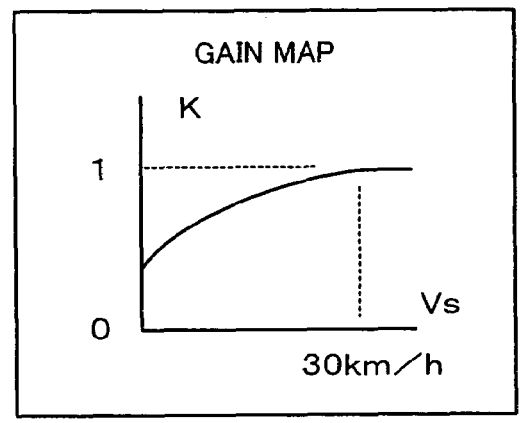
(B)
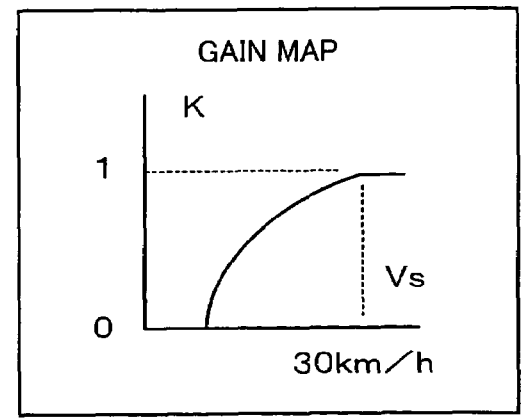
(C)

Prior Art

Prior Art

CONTROL UNIT FOR ELECTRIC POWER STEERING APPARATUS

TECHNICAL FIELD

The present invention relates to a control unit for electric power steering apparatus, and more particularly to a control unit for electric power steering apparatus for reducing a motor noise.

BACKGROUND ART

An electric power steering apparatus for applying a steering assist force to a steering mechanism of an automobile by a rotating force of a motor transmits a driving force of the motor by a transmitting mechanism such as a gear or a belt through a reduction gear to apply the steering assist force to a steering shaft or a rack shaft. An example of a brief structure of such an electric power steering apparatus is shown in FIG. 7 and will be described.

A shaft 102 of a steering wheel 101 is coupled to tie rods 106 of steered wheels through a reduction gear 103, universal joints 104a and 104b, and a pinion rack mechanism 105. The shaft 102 is provided with a torque sensor 107 for detecting steering torque of the steering wheel 101, and a motor 108 for assisting a steering force of the steering wheel 101 is coupled to the shaft 102 through the reduction gear 103.

A control of the motor 108 is very important for the electric power steering apparatus mentioned above, and it is necessary to control the motor 108 in correspondence to a steering operation, a vehicle speed or the like. For example, FIG. 8 is a control block diagram of the motor 108 using a vector control which has been well known conventionally.

Describing the control block diagram, a torque command value Tref, a rotation angle θ and an angular velocity ω are input to a current command value calculating portion 204. The torque command value Tref is calculated by a torque command value calculating portion 220 corresponding to a torque command value calculating means on the basis of a steering torque Tr detected by the torque sensor 107, and the rotation angle θ corresponds to an electrical degree of the motor 108. The current command value calculating portion 204 calculates a current command value Iqref of a q-axis component and a current command value Idref of a d-axis component. Generally, the current command value Iqref changes in proportion to the torque command value Tref, and the current command value Idref equals to 0 (generally, a relation Idref=0 is established). On the other hand, an angle detecting device for detecting the rotation angle θ of the motor 108 is installed. The angle detecting device includes an encoder, a Hall sensor or the like, however, employs an angular resolver 201 in this case. Since a signal output from the angular resolver 201 does not directly indicate the rotation angle θ, a position detecting circuit 202 for executing a calculating process is necessary, and an RDC circuit or the like is used for the angular resolver 201. If the rotation angle θ output from the position detecting circuit 202 is input to a differential calculating portion 203, the angular velocity ω is calculated. The rotation angle θ and the angular velocity ω are used in a control mentioned below.

The present control block diagram employs a feedback control as an example, and it is necessary to execute a feedback control by detecting actual motor currents Ia, Ib and Ic of the motor 108, with respect to the current command values Iqref and Idref mentioned above. Specifically, the motor currents Ia, Ib and Ic are detected in the current detecting devices 205-1, 205-2 and 205-3, and are converted to motor currents Iq and Id in a three-phase/two-phase conversion portion 206 for the vector control. The rotation angle θ of the motor mentioned above is used for the conversion. Next, the motor currents Iq and Id are fed back to subtraction portions 207 and 207-2, a deviation ΔIq between the current command value Iqref and the motor current Iq is calculated by the subtraction portion 207-1, and a deviation ΔId between the current command value Idref (normally Idref=0) and the motor current Id is calculated by the subtraction portion 207-2.

In order to eliminate the deviations, they are input to a proportional integral (PI) calculating portion 208, and voltage command value Vd and Vq are output. Further, since it is necessary that the actual motor 108 supplies a three-phase current, the voltage command values Vd and Vq are converted to three-phase voltage command values Va, Vb and Vc by a two-phase/three-phase conversion portion 209. A PWM control portion 210 generates a PWM control signal on the basis of the voltage command values Va, Vb and Vc, and an inverter circuit 211 supplies the current to the motor 108 on the basis of the PWM control signal, and supplies the motor currents Ia, Ib and Ic in such a manner that the deviations with respect to the current command value Iqref and Idref disappear.

The control mentioned above corresponds to a basic control with respect to the motor 108, however, a capacity of the motor 108 has a limit. In the case of steering the steering wheel at a high speed, a power of the motor runs short. Accordingly, there is a case that a high-speed rotation is achieved by restricting an output torque of the motor, and a control having a constant power is executed. In order to achieve the control mentioned above, a control method called as a field weakening control is used. A relation q-axis current command value Idref=0 is generally established, however, in the case of the field weakening control, the relation Idref=0 is not equivalently established. The d-axis current command value Idref corresponds to a current component corresponding to a field magnetic flux, and increasing the d-axis current command value Idref in a negative direction is equivalent to weakening the field magnetic flux on the axis d. If the field magnetic flux is weakened, a counter electromotive force becomes small. Accordingly, it is possible to rotate the motor at a higher rate.

There is provided a device improving a feeling of a steering in a rapid wheel steering, by executing the field weakening control.

Specifically, in the case that the field weakening control is achieved by a advance angle control of the vector control, the following numerical expression 1 is executed with respect to the voltage command values Vd and Vq, in a two-phase/three-phase conversion portion 209, on the basis of an angle φ of the advance angle calculated by a advance angle calculating portion 212 described in detail below, in FIG. 8, and the voltage command values Va, Vb and Vc are calculated.

Numerical Expression 1

$$\begin{bmatrix} Va \\ Vb \\ Vc \end{bmatrix} = \begin{bmatrix} -\cos(\theta+\phi) & \sin(\theta+\phi) \\ -\cos(\theta+\phi-2\pi/3) & \sin(\theta+\phi-2\pi/3) \\ -\cos(\theta+\phi+2\pi/3) & \sin(\theta+\phi+2\pi/3) \end{bmatrix} \begin{bmatrix} Vd \\ Vq \end{bmatrix}$$

In this numerical expression 1, the current command value (the d-axis current command value) for weakening the field is calculated by being advanced at the angle φ. In other words, in the advance angle control, the field current command value for weakening the field means the angle φ of the advance angle. In other words, a component generated by the angle φ generates an effect of weakening the field, in the voltage command values Va, Vb and Vc.

Next, a description will be given of a specific calculating method of the angle φ of the advance angle with reference to FIG. 9. A base angular velocity ωb is calculated in a conversion portion 212a by setting the torque command value Tref to an input, while a mechanical angular velocity ωm is calculated in a mechanical angle calculating portion 212b having an angular velocity ω of the motor 108 calculated in the differential calculating portion 203, and the angle φ is calculated in an arcCOS calculating portion 212c, on the basis of a relation angle φ=arcCOS (ωm/ωb). The angle φ is a value which first appears at a time when the mechanical angular velocity ωm of the motor becomes higher than the base angular velocity ωb, as is known from an expression angle φ=arcCOS (ωm/ωb), in other words, the field weakening control is executed at a time when the mechanical angular velocity ωm of the motor becomes higher than the base angular velocity ωb.

The control mentioned above is the basic of the field weakening control, however, in order to achieve a electric power steering apparatus having a good wheel steering feeling all the time in various steering wheel operation and vehicle speed conditions, by applying various improvements to the field weakening control, the field weakening control is executed so as to correspond to a change of the steering operation, the vehicle speed or the like.

For example, in Japanese Patent Application Laid-Open (JP-A) No. 2003-40128, an improvement of adjusting the current command value Idref in correspondence to the vehicle speed is applied to the d-axis current command value Idref. The improvement content employs an improving method of making the q-axis current command value Iqref which changes in proportion to an output torque large by making smaller than the current command value Idref in the case of considering no vehicle speed, in the case that the vehicle speed is high, in order to secure the output torque of the motor preferably. In other words, when the vehicle speed is low, the wheel steering feeling is improved by making the current command value Idref smaller in accordance that the vehicle speed becomes higher, while keeping the current command value Idref normal, thereby securing the output torque preferably.

As mentioned above, it is very important in view of a performance improvement for improving a wheel steering feel of the electric power steering apparatus to control the d-axis current control value Idref. On the other hand, there is a problem that the greater the d-axis current Id affecting the field current is, the larger the noise generated by the motor is. In this case, the noise in the vehicle is caused by a noise generated between a tire and a road surface, a wind noise of a vehicle body and the like, in addition to the noise generated by the motor of the electric power steering apparatus. Further, the noise such as the noise generated between the tire and the road surface, the wind noise of the vehicle body and the like has a characteristic that the noise becomes larger in accordance that the vehicle speed becomes higher. In other words, when the vehicle speed is low, the motor noise generated by the current command value Idref largely affects the noise in the vehicle. Since the noise is large due to the other reasons than the motor at a time when the vehicle speed is high, the motor noise does not largely affect the noise in the vehicle.

DISCLOSURE OF THE INVENTION

The present invention is made by taking the circumstances mentioned above, and an object of the present invention is to provide a control unit for electric power steering apparatus which has a reduced motor noise caused by a field weakening control while employing the field weakening control for improving a wheel steering feel.

The present invention relates to a control unit for electric power steering apparatus which is provided with a motor applying a steering assist force to a steering mechanism, a torque command value calculating means for calculating a torque command value on the basis of a steering torque generated in a steering shaft, and a current command value calculating means for calculating a current command value on the basis of a rotation angle of the motor and the torque command value, drives the motor on the basis of the rotation angle and the current command value. The object mentioned above of the present invention is achieved by being provided with a vehicle speed sensor, and calculating a field current command value weakening a field of the motor on the basis of the vehicle speed.

Further, the object mentioned above of the present invention can be achieved by a structure in which in the case that the field current command value is calculated in accordance with a advance angle control of a vector control, an angle φ of the advance angle control is calculated in response to the vehicle speed.

Further, the object mentioned above of the present invention is achieved by a structure in which in the case that the field current command value is calculated in accordance with a d-axis current command value Idref of a vector control, the d-axis current command value Idref is calculated in response to the vehicle speed.

Further, the object mentioned above of the present invention can be achieved by multiplying the angle φ by a vehicle speed responsive gain K (in this case, 0<K<1) which becomes larger in accordance that the vehicle speed becomes higher. Further, the object mentioned above of the present invention can be achieved by multiplying the d-axis current command value Idref by a vehicle speed responsive gain K (in this case, 0<K<1) which becomes larger in accordance that the vehicle speed becomes higher.

BRIEF DESCRIPTION OF THE DRAWINGS

FIG. 6 is a view showing a modified embodiment of a gain map according to the present invention;

BEST MODE FOR CARRYING OUT THE INVENTION

Figure 1:
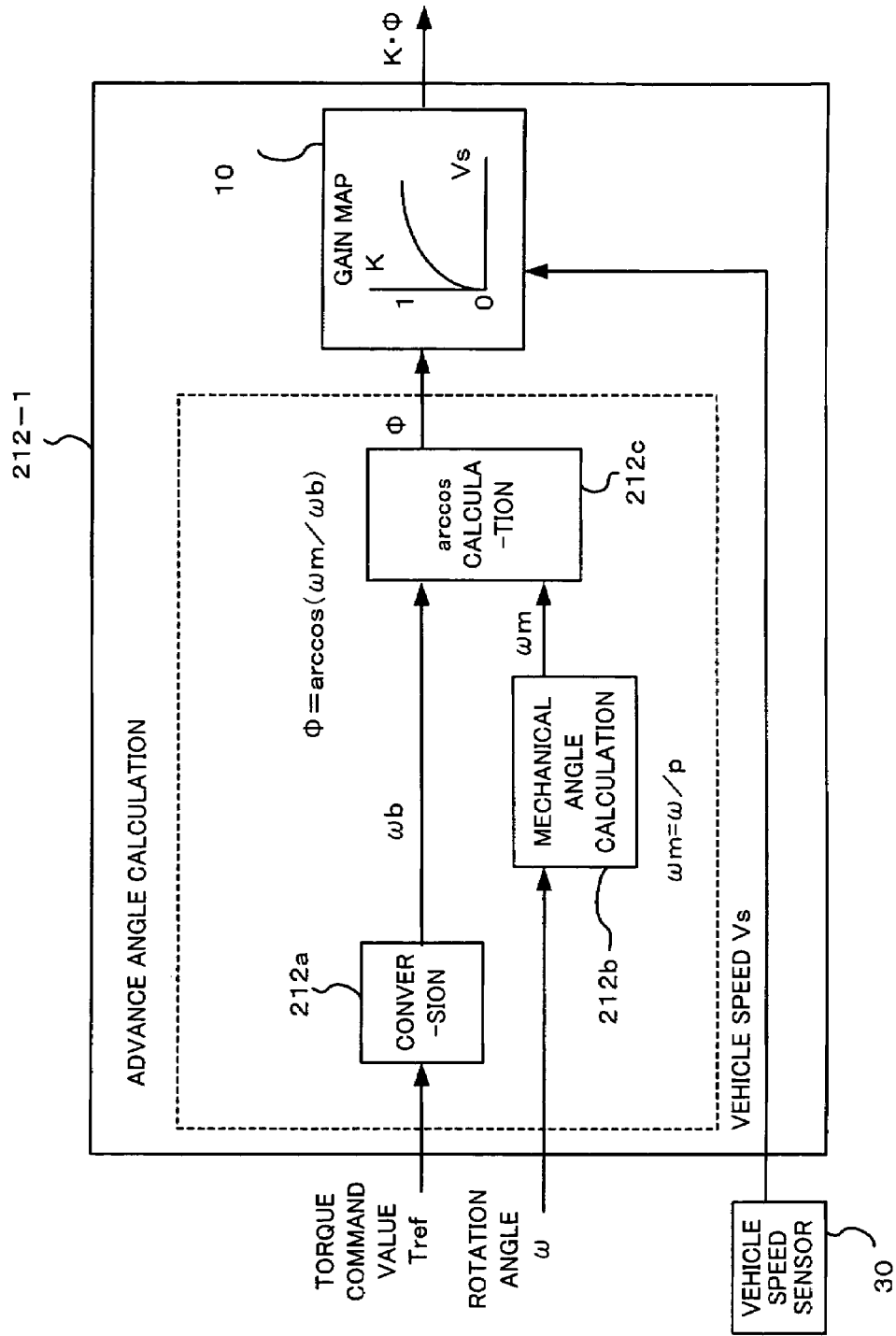
FIG. 1 is a control block diagram of a advance angle control for a field weakening control according to the present invention.

A description will be given of preferred embodiments according to the present invention with reference to the accompanying drawings. The elements having the same reference numerals as the reference numerals used in the prior art have the same function.

Embodiment 1

FIG. 1 shows an embodiment using the present invention, which corresponds to an embodiment using an angle K·φ (corresponding to a new field current command value for weakening a field) freshly calculated by multiplying an angle φ (corresponding to a field current command value for weakening the field) by a vehicle speed responsive gain K (hereinafter, referred to as a gain K) in correspondence to a vehicle speed Vs detected by a vehicle speed sensor 30. A advance angle calculating portion 212-1 according to the present invention is replaced by a advance angle calculating portion 212 in FIG. 9, and is applied to a control block diagram in FIG. 8. A difference between the advance angle calculating portion 212-1 and the conventional advance angle calculating portion 212 exists in that a gain map 10 having the angle φ corresponding to an output of an arcCOS calculating portion 212c of the advance angle calculating portion 212 and a vehicle speed Vs corresponding to an output of the vehicle speed sensor 30 as an input is connected, and a new angle k·φ forms an output of the gain map 10, that is, the new angle K·φ forms an output of the advance angle calculating portion 212-1. The gain map 10 has the vehicle speed Vs detected by the vehicle speed sensor 30 and the angle φ corresponding to the output of the advance angle calculating portion 212 as an input, and outputs a value K·φ obtained by multiplying by the gain K. The gain K has a characteristic that the gain becomes larger toward 1 from 0 in accordance that the vehicle speed Vs becomes higher. For example, a relation K=0 is established in the case that the vehicle speed Vs equals to 0 km/h, a relation K=1 is established in the case that the vehicle speed equals to 30 km/h, and K adopts a value between 0 and 1 in the case that the vehicle speed Vs is equal to or more than 0 km/h and equal to or less than 30 km/h. Accordingly, the angle φ calculated and output in the advance angle calculating portion 212 is input to the gain map 10, and the gain map 10 calculates the angle K·φ obtained by multiplying the angle φ by the gain K determined in response to the vehicle speed Vs output from the vehicle speed sensor. In other words, the advance angle calculating portion 212-1 outputs the new angle K·φ.

Figure 8:
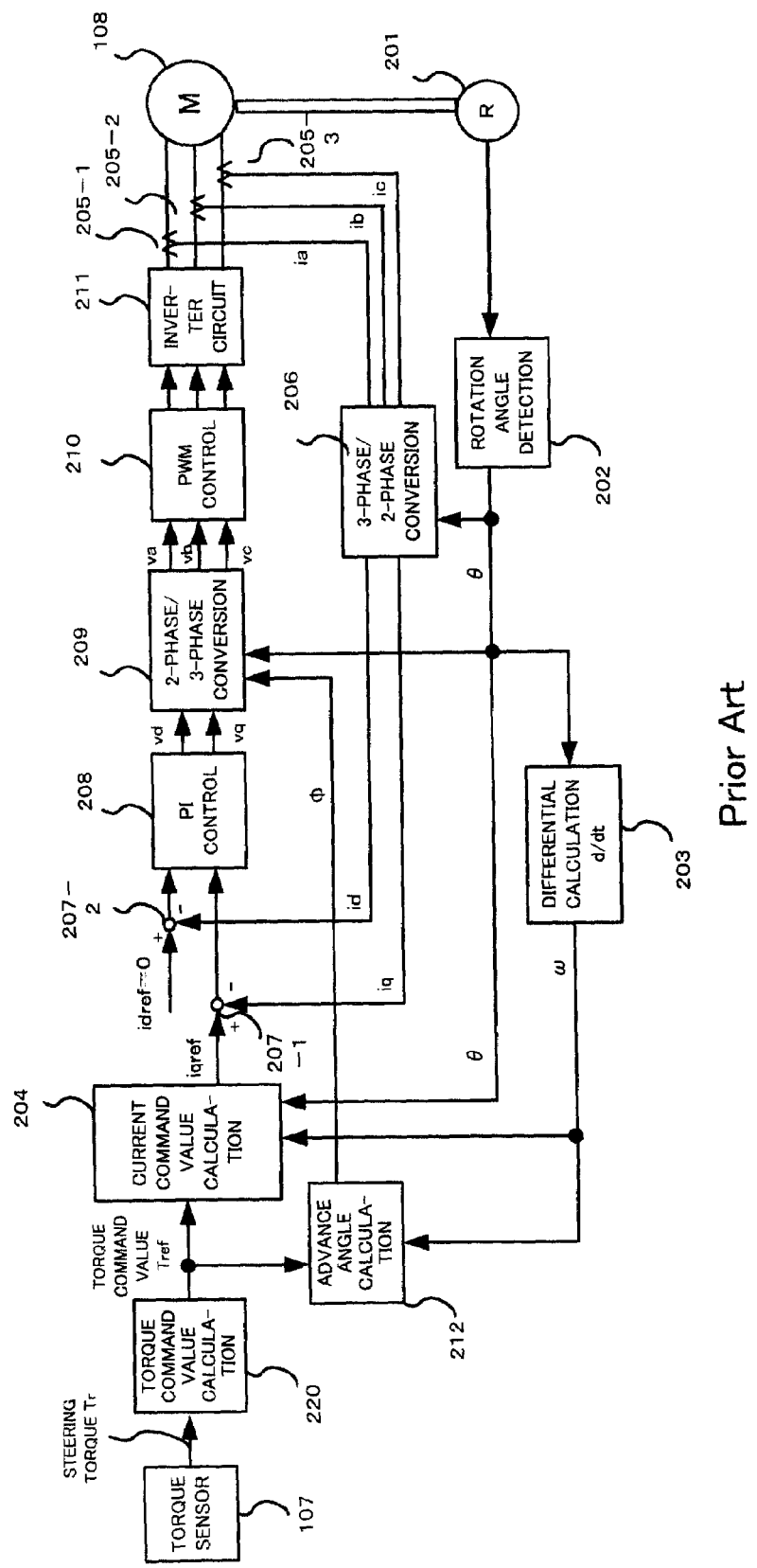
FIG. 8 is a control block diagram of a conventional vector control.
Figure 9:
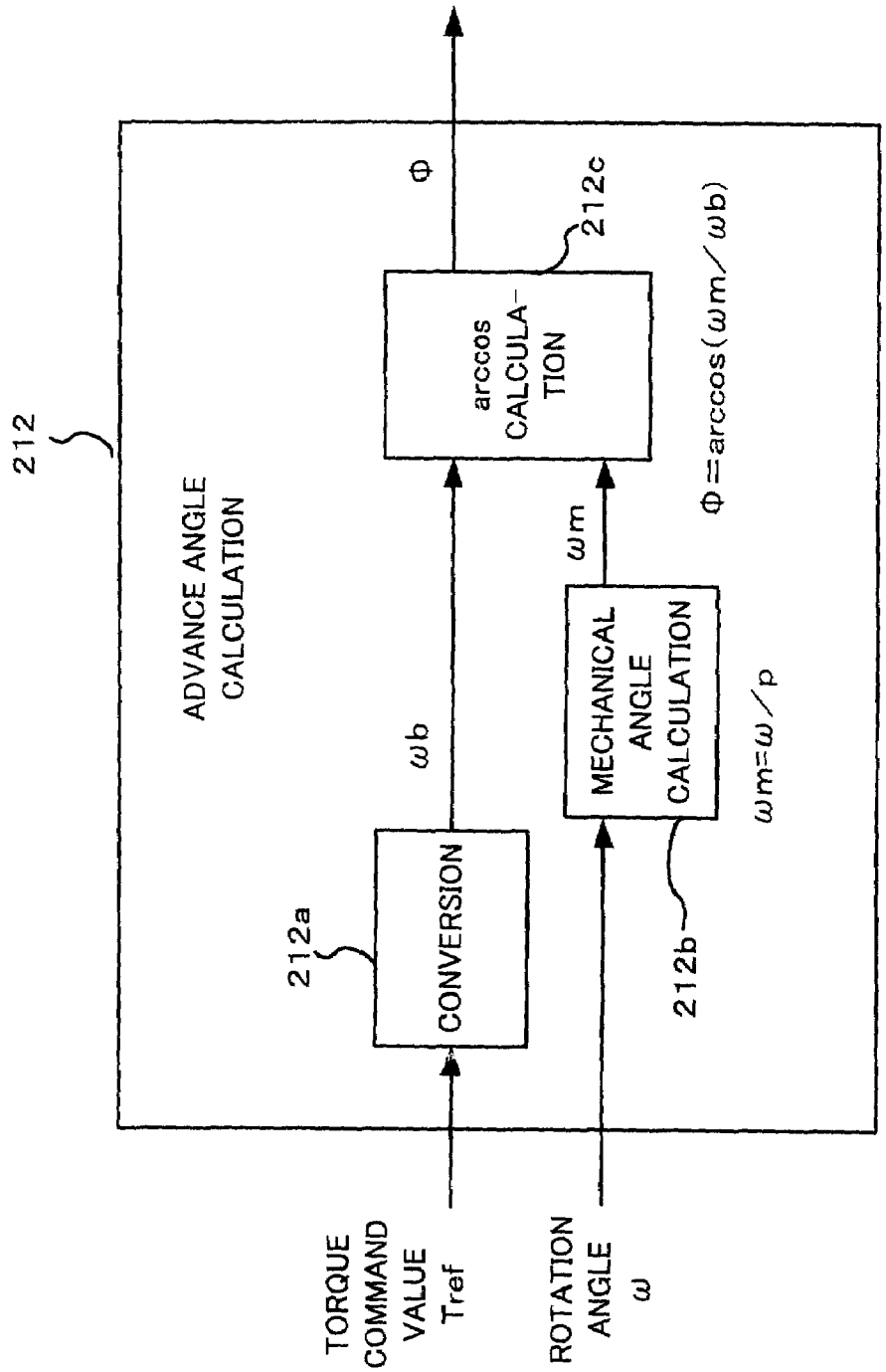
FIG. 9 is a control block diagram of a conventional advance angle control for a field weakening control.

A control of a control block diagram shown in FIG. 8 to which the advance angle calculating portion 212-1 is applied is executed as follows. First, in the case that the angular velocity ω of the motor is lower than a base angular velocity ωb, the field weakening control is not executed because the angle φ corresponding to the output of the arcCOS calculating portion 212C is 0 and the angle K·φ corresponding to the output of the advance angle calculating portion 212-1 is 0. Accordingly, since the motor does not generate any noise, the present invention is not applied.

However, if the angular velocity ω becomes higher, and a mechanical angular velocity ωm obtained by converting the angular velocity ω becomes higher than the base angular velocity ωb, the value φ corresponding to the output of the arcCOS calculating portion 212C has a value which is not equal to 0. However, since the field weakening control by the angle φ is executed independently from the vehicle speed Vs, the motor noise caused by the field weakening control is felt burdensome in the case that the vehicle speed Vs is low and the other noises than the motor noise are small. However, the advance angle determining a current component of the field weakening control becomes K·φ from the conventional φ on the basis of the operation of the gain map 10 of the advance angle calculating portion 10 according to the present invention.

Accordingly, in the case that the vehicle speed Vs is low, the value K adopts a value close to 0, and becomes the angle K·φ smaller than the conventional angle φ, whereby the current component of the field weakening control becomes smaller than the conventional one. Accordingly, the motor noise becomes small, and there can be obtained an excellent effect that the noise in the vehicle becomes small. In the case that the vehicle speed Vs is high, the value of the gain map K adopts a value close to 1, and a difference between the conventional angle φ and the new angle K·φ of the present invention is small and has a small change. However, since the other noises than the noise generated by the motor are burdensome, an influence of the noise generated by the motor is small. In other words, since the other noises than the noise of the motor are large in the case that the vehicle speed is high, the field weakening control is given priority and a good feeling of the wheel steering is given priority.

Embodiment 2

An embodiment 2 corresponds to an embodiment in the case that the present invention is applied to a control method called as a pseudo vector control (hereinafter, referred to as PVC control) which utilizes a concept of the vector control in the middle of determining the current command value, calculates three phase current command values Iaref, Ibref and Icref as a final current command value, and sets the feedback motor current to three phase Ia, Ib and Ic, as is different from the typical vector control according to the embodiment 1.

A description will be given first of the conventional PVC control with reference to FIGS. 2 and 3.

Figure 2:
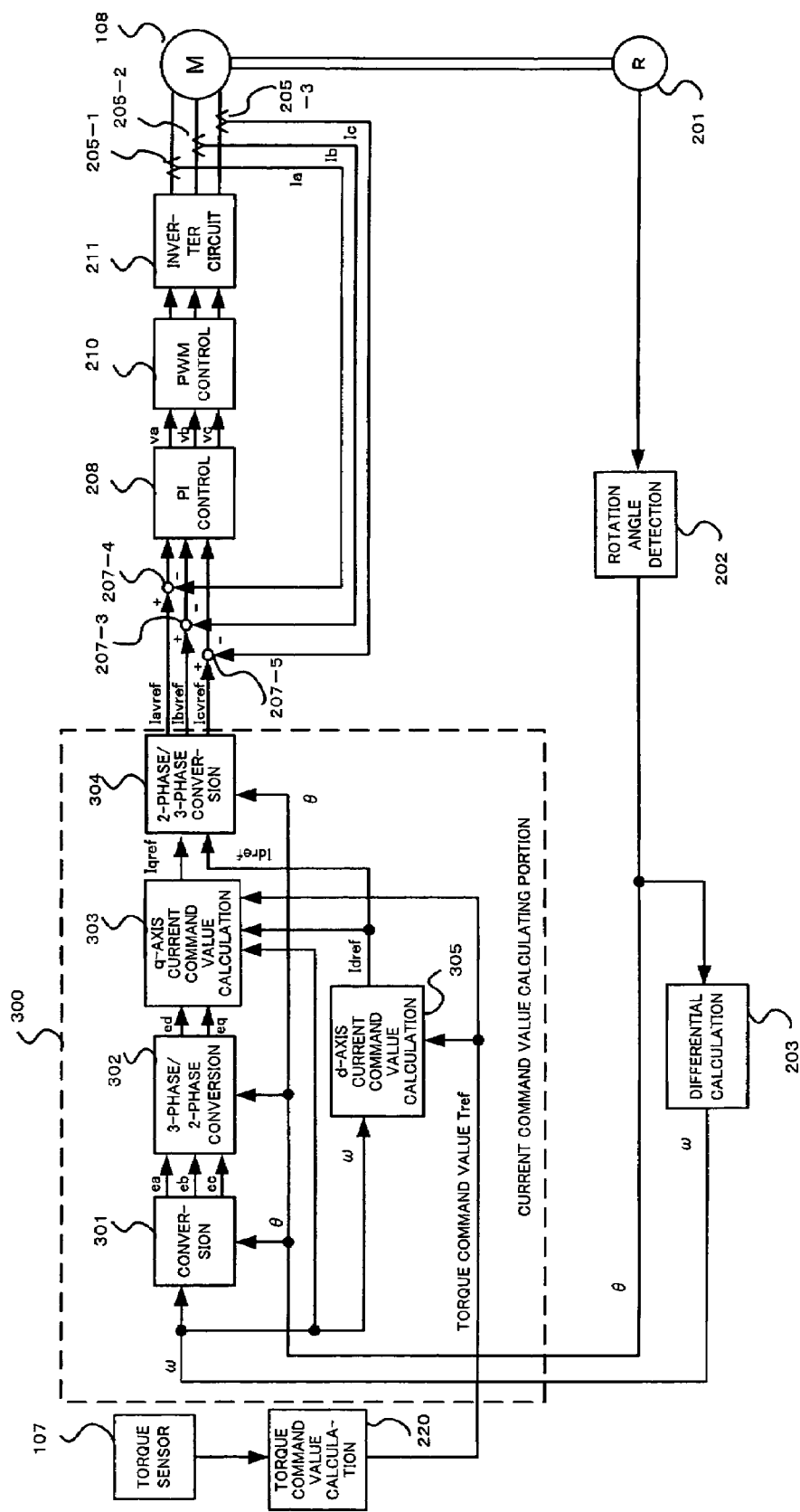
FIG. 2 is a control block diagram of a pseudo vector control.

First, in FIG. 2, if a rotation angle θ output from the position detecting circuit 202 having an output of the angular resolver 201 as an input is input to the differential calculating portion 203, the angular velocity ω is calculated.

Next, a description will be given of a current command value calculating portion 300 determining the current command values Iaref, Ibref and Icref. The torque command value Tref, the angular velocity ω and the rotation angle θ are input to the current command value calculating portion 300, and counter electromotive voltages ea, eb and ec are first calculated in a converting portion 301 while having the angular velocity ω and the rotation angle θ as an input. They are converted to d-axis and q-axis counter electromotive voltages ed and eq by a three-phase/two-phase converting portion 302 while having the rotation angle θ and the counter electromotive voltages ea, eb and ec as an input. A current command value Iqref is determined by a q-axis current command value calculating portion 303 while having the counter electromotive voltages ed and eq, the torque command value Tref, the angular velocity ω and a d-axis current command value Idref mentioned below as an input.

In other words, in the q-axis current command value calculating portion 303, Iqref=⅔ (Tref×ω−ed×Idref)/eq is calculated.

On the other hand, the d-axis current reference value Idref corresponds to a field current command value weakening the field, and is calculated in a d-axis current command value calculating portion 305 while having the torque command value Tref and the angular velocity o as an input. The d-axis current reference value Idref is a main portion of the present invention will be described later in detail with reference to FIG. 3 because it is a main portion of the present invention.

Finally, the current command values Iref and Idref, and the rotation angle θ are input to the two-phase/three-phase converting portion 304, and three phase current reference values Iavref, Ibvref and Icvref are converted.

A control after the three phase current reference values Iavref, Ibvref and Icvref are calculated is an absolutely general feedback control. In other words, the respective phase currents Ia, Ib and Ic of the motor 108 are detected by the current detecting circuits 205-1, 205-2 and 205-3, deviations with the three phase current reference values Iavref, Ibvref and Icvref are calculated by the subtracting circuits 207-3, 207-4 and 207-5, and the deviations are input to the PI control portion 208. In the PI control portion 208, a feedback control is executed by calculating the voltage command values Va, Vb and Vc in such a manner as to make the deviations zero. A gate signal of the PWM to the inverter circuit 211 is calculated in the PWM control portion 210 while having the voltage command values Va, Vb and Vc as an input, the inverter circuit 211 is PWM controlled on the basis of the gate signal, and is controlled so as to apply the current to the motor 108 in such a manner that the respective phase currents Ia, Ib and Ic become the current reference values Iavref, Ibvref and Icvref.

Figure 3:
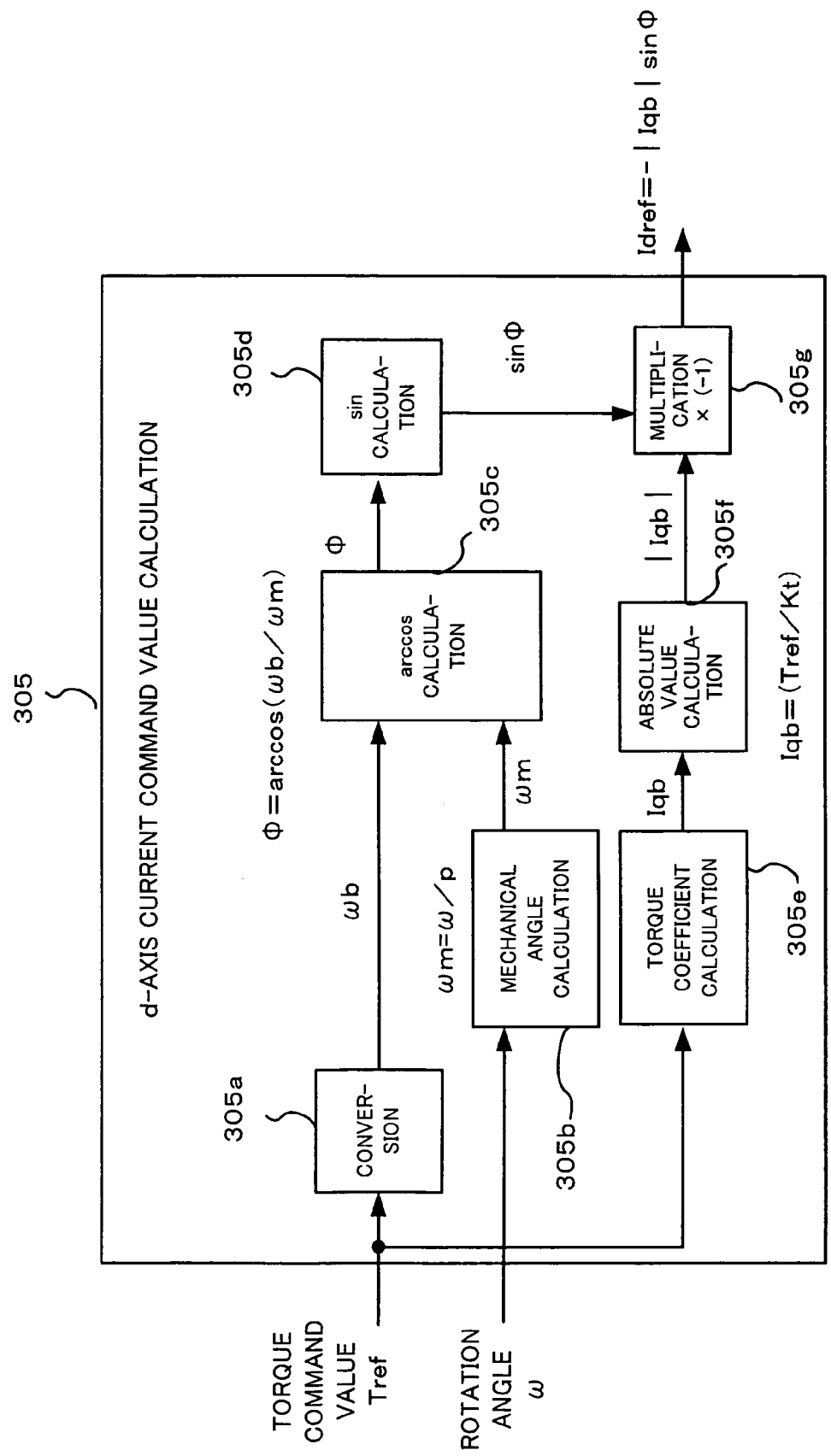
FIG. 3 is a control block diagram of a field weakening control of the pseudo vector control.

In this case, a description will be freshly given of the d-axis current command value calculating portion 305 with reference to FIG. 3. First, the torque command value Tref is input to a converting portion 305a, and the base angular velocity ωb is calculated. On the other hand, in a mechanical angle calculating portion 305b, the mechanical angular velocity ωb converted to the mechanical angle is output while setting the angular velocity ω to an input. An angle φ=arcCOS (ωb/ωm) is executed in an arcCOS calculating portion 305c while setting the base angular velocity ωb and the mechanical angular velocity ωm to an input, and the angle φ is output. Next, sin φ is output in a sin calculating portion 305d while setting the angle φ to an input.

On the other hand, a reference current Iqb satisfying a relation reference current Iqb=(Tref/Kt) is calculated in a torque coefficient calculating portion 305e while setting the torque command value Tref to an input. In this case, reference symbol Kt denotes a torque coefficient. An absolute value is adopted in an absolute value calculating portion 305f by setting the reference current Iqb to an input, and an absolute value |Iqb| of the reference current is output. Finally, the d-axis current command value Idref is output as Idref=−|Iqb|·sin φ in a multiplying portion 305g while having sin φ corresponding to the output of the sin calculating portion 305 and |Iqb| as an input.

As a result, the d-axis current reference value Idref is calculated as Idref=−|Tref/Kt|·sin (arcCOS (ωb/ωm))=−|Iref|·sin (arcCOS (ωb/ωm)) in the d-axis current command value calculating portion 305.

As is known from (arcCOS (coωb/ωm) in the expression expressing Idref, when the mechanical angular velocity ωm of the motor becomes higher than the base angular velocity ωb, Idref corresponding to the field current command value for weakening the field appears as a value. In other words, when the mechanical angular velocity ωm of the motor becomes higher than the base angular velocity ωb, the field weakening control is executed.

A description will be given of an embodiment in which the present invention is applied to the motor control using the PVC control mentioned above with reference to FIG. 4. The d-axis current command value calculating portion 305-1 in FIG. 4 corresponds to ad-axis current command value calculating portion to which the present invention is applied, and is provided for the PVC control in the control block diagram in FIG. 2 in place of the conventional d-axis current command value calculating portion 305 in FIG. 3. A value K·Idref obtained by multiplying the conventional d-axis current command value Idref by a gain K shown by a gain map 20 forms a new d-axis current command value, and executes the field weakening control.

Specifically, the new d-axis current command value K·Idref is calculated by setting the d-axis current command value Idref corresponding to the output of the multiplying portion 305g of the conventional d-axis current command value calculating portion 305 and the vehicle speed Vs corresponding to the output of the vehicle speed sensor 30 to the input of the gain map 20. The gain map 20 basically has the same characteristic as the gain map 10. In other words, the gain K has a characteristic of being larger toward 1 from 0 in accordance that the vehicle speed Vs becomes higher. For example, K=0 is established in the case that the vehicle speed Vs equals to 0 km/h, K=1 is established in the case that the vehicle speed equal to 30 km/h, and the value K adopts a value between 0 and 1 in the case that the vehicle speed Vs is equal to or more than 0 km/h and equal to or less than 30 km/h.

Figure 4:
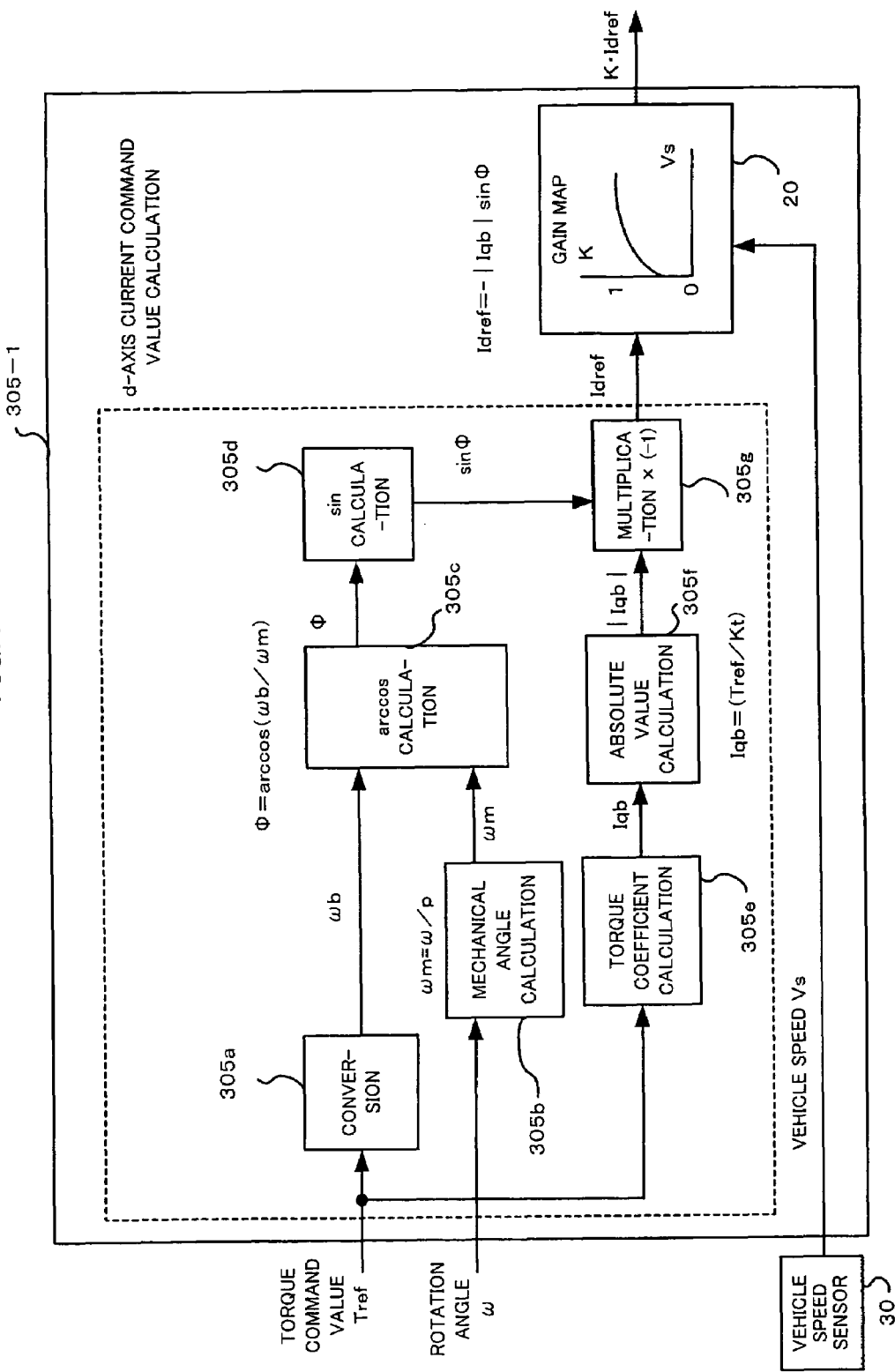
FIG. 4 is a control block diagram in which the present invention is applied to the field weakening control of the pseudo vector control.

An operation and an effect of the gain map 20 having the characteristic mentioned above correspond to the following operation and effect in the PVC control of the motor structured from FIGS. 2 and 4. First, in the case that the mechanical angular velocity ωm of the motor is lower than the base angular velocity ωb, a relation sin φ=0 is established because the value φ corresponding to the output of the arcCOS calculating portion 305c is 0. Further, since a relation Idref=−|Iqb|·sin φ=0 is established, K·Idref corresponding to the output of the d-axis current command value calculating portion 305-1 becomes 0 and the field weakening control is not executed. Accordingly, the effect of the gain K according to the present invention cannot obtained, however, since the field weakening control is not executed, the motor noise by the d-axis current is not generated and thus no problem is generated.

However, when the mechanical angular velocity ωm becomes higher than the base angular velocity ωb, the angle φ corresponding to the output of the arcCOS calculating portion 305c does not equal to 0, and sin φ generates a value between 0 and 1. The output value of the multiplying portion 305g Idref=−|Iqb|·sin φ generates a value, and the field weakening control is executed. Since the field weakening control has been conventionally executed independently from the vehicle speed Vs, in the case that the vehicle speed Vs is low and the other noises than the motor noise are little, the motor noise caused by the d-axis current is felt burdensome. However, the d-axis current of the field weakening control is changed to the new value K·Idref from the conventional value Idref on the basis of the operation of the gain map 20 indicating the value of the vehicle speed responsive gain K according to the present invention. In the case that the vehicle speed is low (for example, equal to or lower than 30 kin/h), the value of the gain K becomes a value equal to or less than 1 and adopts a smaller value in accordance that the vehicle speed is lower. Accordingly, the new d-axis current becomes a smaller value than the conventional d-axis current value. Therefore, even in the case that the vehicle speed is low, and the portion in the vehicle is comparatively quiet, the d-axis current becomes smaller than the conventional one, and the motor noise is reduced. Accordingly, there can be obtained an excellent effect of keeping the quiet in the vehicle in the case that the vehicle speed is low.

On the other hand, in the case that the vehicle speed Vs is high, for example, in the case that it is equal to or higher than 30 km/h, the value of the gain map K becomes 1, and the conventional d-axis current Idref and the new d-axis current K·Idref become an equivalent value. Accordingly, since the field weakening control by the same d-axis current value as the conventional one is executed, the motor noise in accordance with the field weakening control is generated at the same level, however, since the other generated noises than the motor noise is large in the case that the vehicle speed is high, the motor noise is not bothersome. In other words, in the case that the vehicle speed is high, since the other noises than the motor noise are loud, the field weakening control is given priority and the good feeling of the wheel steering is given priority.

Figure 5:
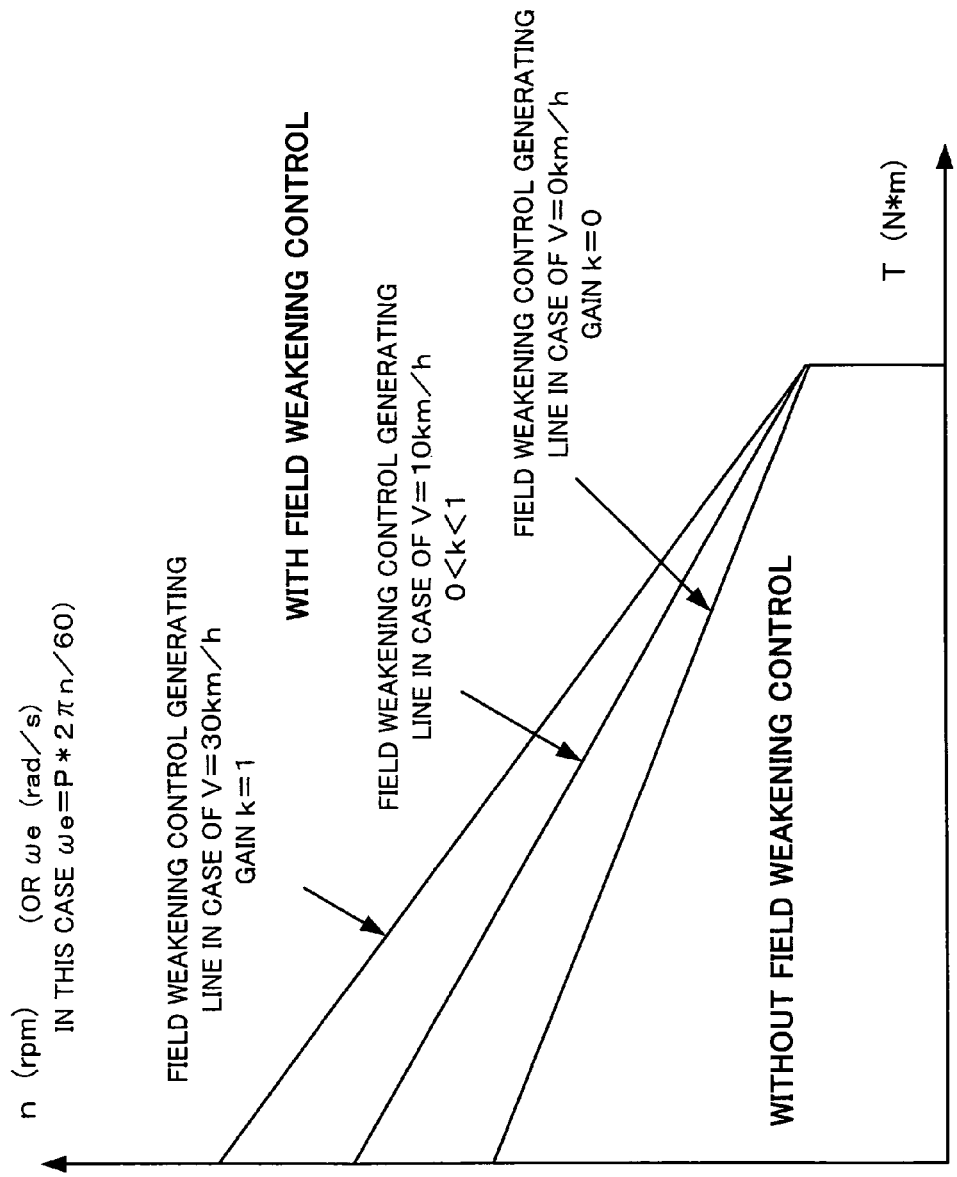
FIG. 5 is a view showing an effect in the case that the present invention is applied to the field weakening control.
Figure 7:
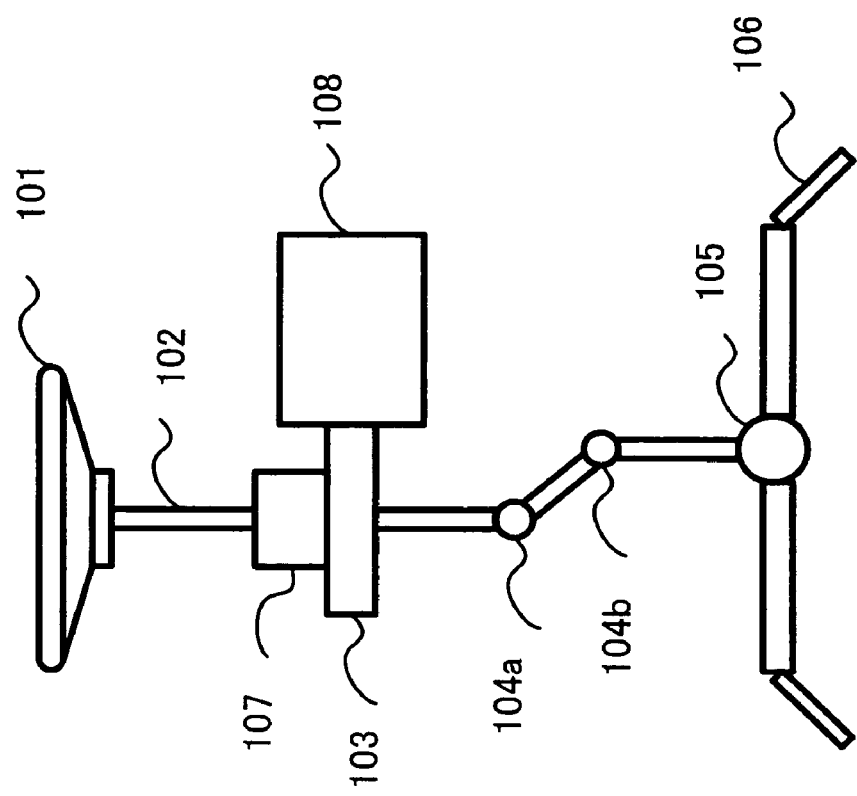
FIG. 7 is a schematic view of an electric power steering apparatus.

FIG. 5 explains a region of the field weakening control which is changed in accordance with the vehicle speed in the case that the present invention is used. The gain K becomes 0 in the case that the vehicle speed Vs is 0 km/h, becomes 1 in the case that the vehicle speed Vs is 30 km/h, and adopts a value between 0 and 1 in the case that the vehicle speed is between 0 km/h and 30 km/h. The same field weakening control as the conventional one is executed in the case that the vehicle speed Vs is 30 km/h, however, the field weakening control is more weakly executed than the conventional one in the case that the vehicle speed Vs is 30 km/h. In other words, in the case that the vehicle speed is low, there is executed the control which attaches importance to the suppression of the motor noise in comparison with the good feeling of the wheel steering.

FIG. 6 is a view showing a modified embodiment of the gain map showing the value of the vehicle speed responsive gain K changing in response to the vehicle speed Vs. In FIG. 6A, the gain K generates a value equal to or more than 0 from a time when the vehicle speed Vs is 0 km/h, the gain K becomes larger in a parabolic manner in accordance that the vehicle speed Vs becomes higher, and there is formed a gain map in which a relation K=1 is established at a predetermined vehicle speed, for example, 30 km/h, and the relation K=1 is maintained in the case that the vehicle speed is higher than the predetermined vehicle speed.

In FIG. 6B, the gain K is not 0, but has a certain value, for example, 0.3 even if the vehicle speed is 0 km/h, secures the d-axis current for the field weakening control at a certain level, attaches importance to the motor noise, and secures the good feeling of the wheel steering caused by the field weakening control.

FIG. 6C has a characteristic which does not execute the field weakening control while setting the value K to 0 until the vehicle speed reaches a certain level, for example, 5 km/h, generates the value equal to or more than 0 in the gain K if the vehicle speed becomes a high speed equal to or more than 5 km/h, and makes the gain K larger in accordance that the vehicle speed becomes higher, for example, sets the value K to 1 if the vehicle speed reaches 30 km/h, and maintains the relation K=1 in the case that the vehicle speed is higher than 30 km/h.

As mentioned above, it is possible to determine the characteristic of the gain map on the basis of the relation between the motor noise and the wheel steering feeling.

It goes without saying that the adjustment of the amount of the d-axis current in correspondence to the vehicle speed mentioned above can be achieved by a hardware or a software. Further, the control to which the present invention is applied is not limited to the feedback control and the PVC control described in the embodiment. It is possible to apply the general vector control described in JP-A No. 2003-40128.

As described above, according to the present invention, in the case that the vehicle speed is low and the other generated noises than the motor noise are small, it is possible to suppress the motor noise so as to reduce the noise in the vehicle by making the d-axis current Idref corresponding to the field weakening control smaller than the conventional one, and in the case that the vehicle speed is high and the other generated noises than the motor noise are large, it is possible to apply the wheel steering having a good feeling with respect to the rapid steering by executing the same field weakening control as the conventional one. Accordingly, it is possible to expect an excellent effect.

INDUSTRIAL APPLICABILITY

According to the present invention, in the case that the vehicle speed is low, it is possible to reduce the generation of the motor noise so as to suppress the noise in the vehicle by making the current command value of the field weakening control generating the motor noise smaller, and in the case that the vehicle speed is high, it is possible to secure the wheel steering having a good feeling without making the current command value of the field weakening control smaller because the other noises than the motor noise are large and the motor noise is not bothersome. Accordingly, there can be obtained an excellent effect that it is possible to provide the control apparatus of the electric power steering apparatus having the above characteristics.

What is claimed is:

1. A control unit for electric power steering apparatus comprising:
    a motor applying a steering assist force to a steering mechanism;
    a torque command value calculating means for calculating a torque command value on the basis of a steering torque generated in a steering shaft;
    a current command value calculating means for calculating a current command value on the basis of a rotation angle of the motor and the torque command value; and
    a vehicle speed sensor detecting a vehicle speed;
    wherein the motor is driven on the basis of the rotation angle and the current command value, and a field current command value weakening a field of the motor is calculated on the basis of an angle $\phi$ of an advance angle control of a vector control that is calculated in response to the vehicle speed.

2. A control unit for electric power steering apparatus according to claim 1, wherein the control unit multiplies the angle $\phi$ by a vehicle speed responsive gain K which is smaller than 1 and becomes larger as the vehicle speed becomes higher.

3. A control unit for electric power steering apparatus comprising:
    a motor applying a steering assist force to a steering mechanism;
    a torque command value calculating means for calculating a torque command value on the basis of a steering torque generated in a steering shaft;
    a current command value calculating means for calculating a current command value on the basis of a rotation angle of the motor and the torque command value; and
    a vehicle speed sensor detecting a vehicle speed;
    wherein the motor is driven on the basis of the rotation angle and the current command value, and a field current command value weakening a field of the motor is calculated on the basis of a d-axis current command value Idref of a vector control that is calculated in response to the vehicle speed.

4. A control unit for electric power steering apparatus according to claim 3, wherein the control unit multiplies the d-axis current command value Idref by a vehicle speed responsive gain K which is smaller than 1 and becomes larger as the vehicle speed becomes higher.

* * * * *